Patented Mar. 6, 1951

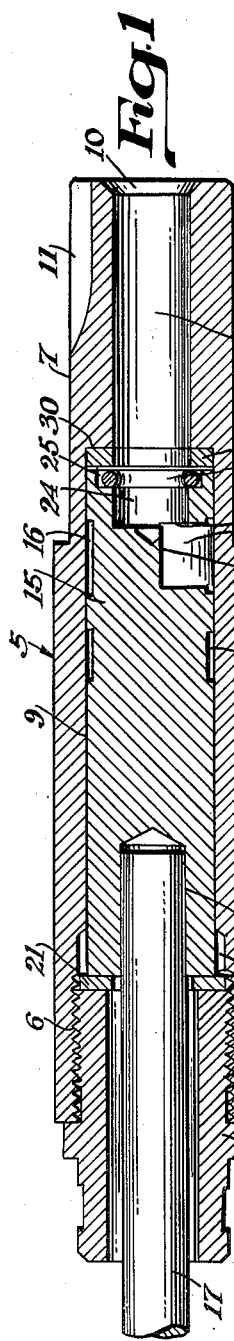
INVENTOR.
MAURICE M. COHEN.

2,544,219

UNITED STATES PATENT OFFICE 2,544,219

POWER-OPERATED TOOL DRIVING APPARATUS

Maurice M. Cohen, Cleveland Heights, Ohio

Application June 9, 1945, Serial No. 598,492

3 Claims. (Cl. 279—79)

The present invention relates to power operated tool driving apparatus, and more particularly to an improvement in the type of apparatus shown in my Patent No. 2,259,797.

The type of apparatus referred to comprises, in general, a tubular handle adapted to hold a manicuring tool, or the like, that is driven by a rotating spindle member in the handle, which member preferably is rotated by an electric motor through a flexible cable, the motor being mounted on a base separate from the handle. Various types of tools may be held in the handle in driving relation with the rotatable member, depending upon the particular tool desired to be used, and these tools may be changed by merely withdrawing one tool from the handle and inserting another while the driving member is continuously driven by the motor.

In my patent referred to above, there is disclosed a blind coupling arrangement by which the shank of a manicuring tool or the like may be connected in driving relation with the rotating spindle member and resiliently retained in such position by the engagement of a concave portion with a curved section of a flat type spring, the spring being mounted on a surface of the spindle sloping longitudinally relative to the axis of rotation. In this structure the spring was rotated about the axis of rotation of the spindle and would strike the shank of the tool while the shank was being inserted and removed from driving relation with the handle. This action was deleterious to the spring and its effectiveness was thereby impaired.

The object of the present invention is to provide a coupling for connecting a tool with a driving member in which the shank of the tool is resiliently maintained in driving relation with a rotating driving member by a spring arrangement by which the shank can be moved into and removed from engagement with the driving member without causing any deleterious stresses on the spring and in which the effectiveness of the spring will last indefinitely.

Another object of the invention is to provide a mechanism for resiliently urging the tools in place in the handle, which mechanism will withstand extensive usage without diminishing effectiveness.

Other objects and advantages of the invention will be apparent from the following description of a preferred form of embodiment of the invention, reference being made to the accompanying drawings wherein:

Fig. 1 is a longitudinal view in section of a handle of a power operated tool driving apparatus;

Fig. 2 is a fragmentary view in section of the handle shown in Fig. 1 and showing a manicuring tool partially inserted in the handle.

Fig. 3 is a view similar to that of Fig. 2, but showing the manicuring tool in engagement with a driving member in the handle;

Fig. 4 is a view in section on line 4—4 of Fig. 3; and

Fig. 5 is a view in elevation of a spring.

In carrying out my invention, provide a tubular handle in which a spindle member is rotatably journalled. The spindle member may be connected at one end with the rotor of an electric motor through a flexible connection, and the opposite end has a surface thereon extending in a direction longitudinally of the handle and this surface is adapted to be engaged by a complementary surface on the end of a shank of the tool to couple the spindle and shank. The shank is insertable in the bore of the hollow handle to be coupled with the spindle member. In order to resiliently urge the shank in the coupled relation with the spindle, an annular ring is carried by the spindle so that the ring is rotated about its axis by the spindle, which axis substantially coincides with the axis of the spindle. The shank of the tool has an enlarged part formed adjacent the spindle engaging end thereof, which portion provides opposed cam surfaces which alternately engage the annular ring as the shank is moved into coupling relation with the spindle so that the spring coacts with the cam surfaces to first resist movement of the shank in the direction of the spindle, and then, after the coupling of the shank and spindle, to resiliently maintain the shank in the coupled position. By this arrangement, no stresses can be placed on the spring that will tend to reduce its effectiveness.

Referring now to the drawings, I have illustrated a manicuring apparatus embodying my invention, but it is to be understood that the invention might be embodied in other forms than that shown, and may be used for purposes other than driving manicuring tools. The apparatus includes a tubular handle 5, one end of which is threaded internally for receiving a coupling bushing 6 and the opposite end portion of the handle is reduced in diameter, as at 7, for receiving the sleeve of a manicuring tool, which is described hereinafter. The axial bore 8 of the portion 7 has a diameter somewhat less than the diameter of the axial bore 9 of the central portion of the handle. Preferably, there is a bevel 10 at the outer end of the bore 8 for facilitating the insertion of a tool shank into the bore. Also, I prefer to provide a keyway 11 in the form of a bayonet lock extending from the end of the handle inwardly for receiving and retaining a key formed on certain of the tools to be used with the handle.

A cylindrical spindle member 15 is rotatively mounted in the bore 9 of the handle, and preferably, lubricant retaining grooves 16 are formed about the member. A flexible drive cable, for example, a Bowden wire 17, is secured in an opening 18 in the member 15, as by brazing, and the other end of the wire may be connected with the rotor shaft of an electric motor, not shown. The wire 17, preferably, is disposed within a flexible tube, not shown. A coupling bushing 20 for guiding the wire 17 is threaded in the threaded end 6 of the handle and an annular member 21, formed of a suitable bearing material, is interposed between the confronting ends of the member 15 and bushing 20.

The opposite end of member 15 has a shallow axial bore 24, which is of the same diameter as bore 8 and is in registration therewith. The outer end portion of bore 24 is enlarged at 25 for receiving an expandible ring type spring 26. Preferably, the spring 26 is a steel spring wire in the form of a ring, split as at 27 for allowing expansion of the ring. It is to be understood, however, that other types of annular, expandible springs might be employed but the type shown is particularly easy to manufacture and assemble in the apparatus. An annular thrust bearing 29 is disposed between the shoulder 30 formed between the bores 8 and 9, and the end of the member 15. The opening through the bearing 29 is of the same diameter as bores 8 and 9, and the end of the member 15. The opening through the bearing 29 is of the same diameter as bores 8 and 24 so that the spring 26 is confined in the enlargement 25 of bore 24. When spindle 15 rotates, the annular spring 26 is rotated about its axis, which axis substantially coincides with the axis of the spindle 15.

A slot 31 is formed in the member 15, as by milling, which slot extends transversely of the member and forms an opening 32 at the inner end of bore 24. The depth of the slot is such that a surface 33 is formed extending substantially parallel to the axis of rotation of the member, and it is preferably spaced slightly therefrom. The surface 33 is engageable by a complementary surface formed on the various manicuring tools for forming a driving connection between the member 15 and the tool.

The mechanism thus far described provides a handle for holding a manicuring tool, which tool may be driven by a motor through a coupling in the handle. Various types of manicuring tools may be inserted and withdrawn from the handle while the coupling is driven by the motor.

Although various types of manicuring tools, or tools for other purposes, may be used in the handle, for example, buffers, cuticle pushers, and brushes, for the purpose of illustrating the manner in which the various tools are coupled in the handle, I have shown a rotary manicuring file 35, which file comprises a sleeve 36 adapted to slide over the end portion 7 of the handle 5. A disc guard comprising a tubular section 37 and a circular flange 38 extending outwardly from one end of the section 37 is press fitted in the sleeve 36. Preferably, the face of flange 38 is undercut and an emery paper disc 39 rotates on the undercut face. The emery disc 39 is driven by a hub 42, the emery disc being removably connected with the hub by a bayonet type connection so that the disc may be readily replaced. The hub 42 is press fitted over the end of a shank 43, and an annular bearing member 44 is disposed about the hub and intermediate the end of section 37 and a flange 49 on the hub. Preferably the sleeve 36 is constricted as at 50 for retaining the hub 42 within the sleeve.

A ridge 45 is formed adjacent the end of the shank 43 by forming sloping surfaces 46 and 47. The surfaces 46 and 47 are in the form of opposed conical sections so that when the end of the shaft is moved through the spring, the spring cooperates with the cam surfaces to first resist movement of the shank and then to urge the shank in the direction of its movement. The end portion of the shank is cut away to form a projection having a surface 48 that is engageable with the surface 33 of member 15 when the manicuring tool is in place on the handle, thereby forming a driving connection between the member 15 and shank. It will be apparent that when the sleeve of the manicuring tool is placed over the portion 7 of the handle, the shank 43 will be inserted through the ring 26 and into engagement with the surface 33 of the spindle member. Then the surface 46 engages the spring, causing the ring to be expanded. This resists movement of the shank inwardly until the ridge 45 engages the spring and at this point no appreciable resistance will be exerted by the spring and the force applied by the operator will move the shank into abutting relation with the end wall of the bore 24. When in this position, the ring 26 acts on the sloping surface 47 to resiliently maintain the manicuring tool in place on the handle. The tool may be removed by overcoming the resistance created by the spring acting on the cam surface 47, and upon the ridge passing through the center of the spring, the shaft 43 is moved from driving engagement with the member 15 by a quick movement.

By providing an annular spring carried in such a manner that its axis coincides with the axis of rotation of the spindle member and the manicuring tool shank, there are no stresses placed on the ring that can adversely affect the spring. It is to be understood that other tools to be driven by my apparatus will include a sleeve similar to sleeve 36 and a shank similar to shank 43 so that these tools may be coupled in the handle similarly to the manner described with reference to the file 35.

Thus, by my invention I have provided a tool driving apparatus in which the tools may be readily attached and detached from the handle element while the driving member is rotated in the handle, and the tools will be resiliently maintained in driving relation with the driving member by mechanism that is extremely simple and practically indestructible by normal use.

Although I have described but one form of the invention, other forms might be adopted, all falling within the scope of the claims which follow.

I claim:

1. A chuck mechanism for a manicuring tool holder comprising a non-rotatable pilot member having a large bore and a relatively small bore to provide a rearwardly facing radial shoulder, a rotatable chucking member disposed in the larger bore of the pilot member and rotatably disposed and axially fixed to terminate short of said shoulder, a manicuring tool shank having a chucking end formation adapted to project past shoulder, the smaller bore of the pilot member being adapted to align the shank of the manicuring tool axially with the rotatable member, the terminating end of the rotatable member having a counterbore of greater diameter than the smaller bore of the pilot member, an annular spring disposed in the counterbore and confined between said shoulder and the terminal end of the rotatable chucking member, a second counterbore in the end of the rotatable chucking member of less diameter than the first counterbore, a flat driving land formation having the surface thereof formed to extend in an axial direction from the bottom of the second counterbore rearwardly in the body of the rotatable member, a complementary driven land formed on the chucking end of the tool shank and said tool shank end having a camming surface formation acted upon by the annular spring for first resisting and then accelerating axial movement of the tool shank when thrust into a driven relation with the terminal end of the rotatable chucking member.

2. A chuck mechanism for a manicuring tool holder comprising a non-rotatable pilot member having a large and a relatively small bore to provide a rearwardly facing radial shoulder, a rotatable chucking member disposed in the larger bore of the pilot member and rotatably disposed and axially fixed to terminate short of said shoulder, a manicuring tool shank having a chucking end formation adapted to project past the shoulder, the smaller bore of the pilot member being adapted to align the shank of the manicuring tool axially with the rotatable member, the terminating end of the rotatable member having a counterbore of greater diameter than the smaller bore of the pilot member, an annular spring disposed in the counterbore and confined between said shoulder and the terminal end of the rotatable chucking member, a second counterbore in the end of the rotatable chucking member of less diameter than the first counterbore, a flat driving land having the surface thereof extending in an axial direction but disposed in offset relation to the axis of the rotatable member and formed to extend from the bottom of the second counterbore rearwardly into the body of the rotatable member, a complementary driven land formed on the chucking end of the tool shank and said tool shank end having a camming surface formation acted upon by the annular spring for first resisting and then accelerating axial movement of the tool shank when thrust into a driven relation with the terminal end of the rotatable chucking member.

3. A manicuring tool shank chucking mechanism comprising a rotating tool driving member retained within a bore formed in a non-rotating member with a chucking end thereof disposed in juxtaposed relation to an internal shoulder in the non-rotating member, an annular constrictive spring means disposed in an annular cavity formed in the juxtaposed end of the rotating member, there being a second annular cavity extending inwardly from the first cavity and having a diameter substantially equal to an end diameter of a manicuring tool shank which it is adapted to receive in slip fit relation, a chucking land formed at the driving end portion of the rotating member to extend from the bottom of the said second cavity in an axial direction and adapted to slidably fit a complementary land on the shank of a manicuring tool, said spring serving to first resist and then grip the shank of an inserted tool when the shank is forced into engagement with the rotating member and the annular wall of the said second cavity serving to act on the circumference of the tool shank when inserted to maintain the land of the shank in proper driven relation to the driving land of the rotating driving member.

MAURICE M. COHEN.

REFERENCES CITED

The following references are of record in the file of this patent:

UNITED STATES PATENTS

| Number | Name | Date |
|---|---|---|
| 666,509 | Furbish | Jan. 22, 1901 |
| 666,511 | Furbish | Jan. 22, 1901 |
| 858,131 | Aichele | June 25, 1907 |
| 1,330,111 | Fegley | Feb. 10, 1920 |
| 1,425,270 | Morgan | Aug. 8, 1922 |
| 1,618,851 | Thunberg et al. | Feb. 22, 1927 |
| 1,958,601 | Zack | May 15, 1934 |
| 2,259,797 | Cohen | Oct. 21, 1941 |
| 2,336,095 | Heding | Dec. 7, 1943 |